Figure 1:
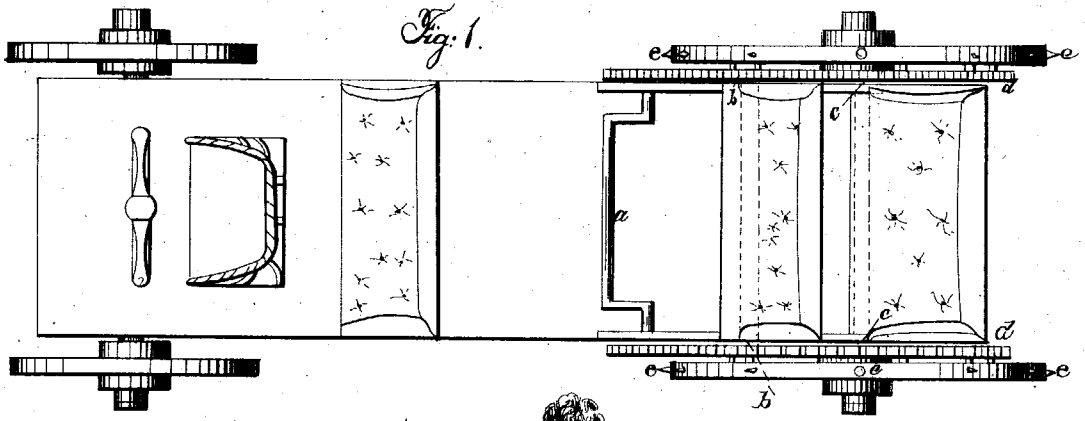
Figure 2:
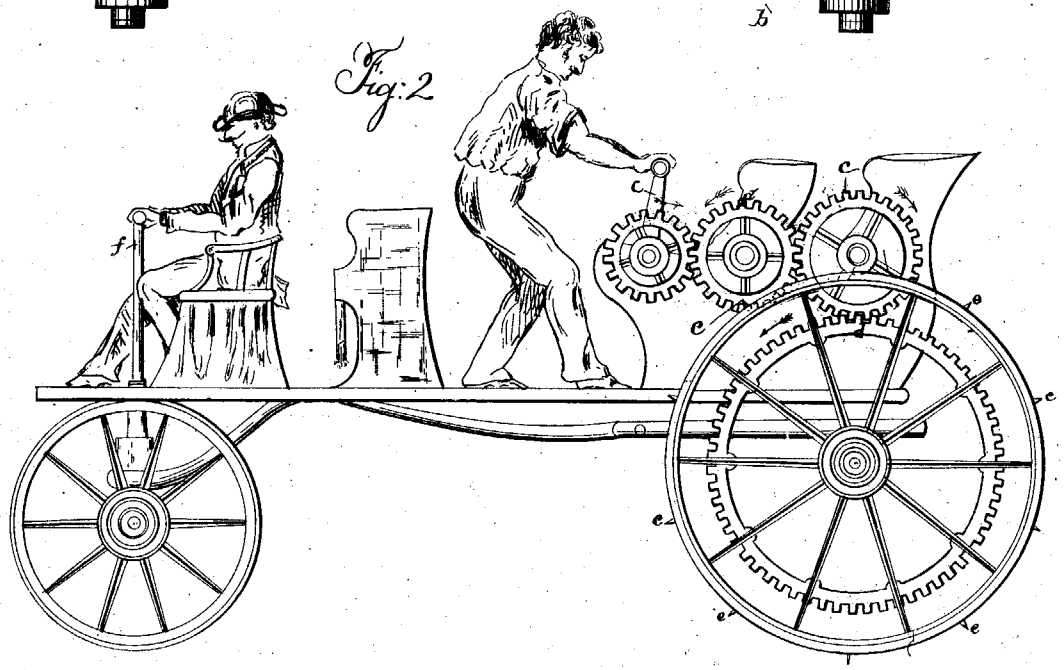

576X

J. BOLTON.

Velocipede.

Patented Sept. 29, 1804.

N. PETERS, PHOTO-LITHOGRAPHER, WASHINGTON, D. C.

5764X [illegible]

John Bolton Jun.r  Sept. 29, 1804

Letters Patent  Signed Sep. 29. 1804.

The schedule referred to in these Letters Patent and making part of the same containing a description in the words of the said John Bolton Jun.r himself of his Waggon or Carriage to be worked by hand.

The Waggon is to be moved with a crank which is to extend from one side to the other, with a wheel at each end, & these wheels to move the second, and the second the third, and the third to move a wheel which is to be nearly of the diameter of, and to be fastened to, the inside of the hind wheels of the carriage; and these hind wheels to be corked with iron corks or pins at the space of eighteen inches apart, to prevent it from slipping. The fore wheels are to be guided with an iron, which is to extend into the waggon to wheel it about, or to steer it in any direction.

Fewer or more operative wheels may be used.

John Bolton Jun.r

Witnesses

John Sewell
Robert Harrison } Washington City 1.12 [illegible] Drawing [illegible] [illegible]

Eq? Chfr